United States Patent Office 3,172,744
Patented Mar. 9, 1965

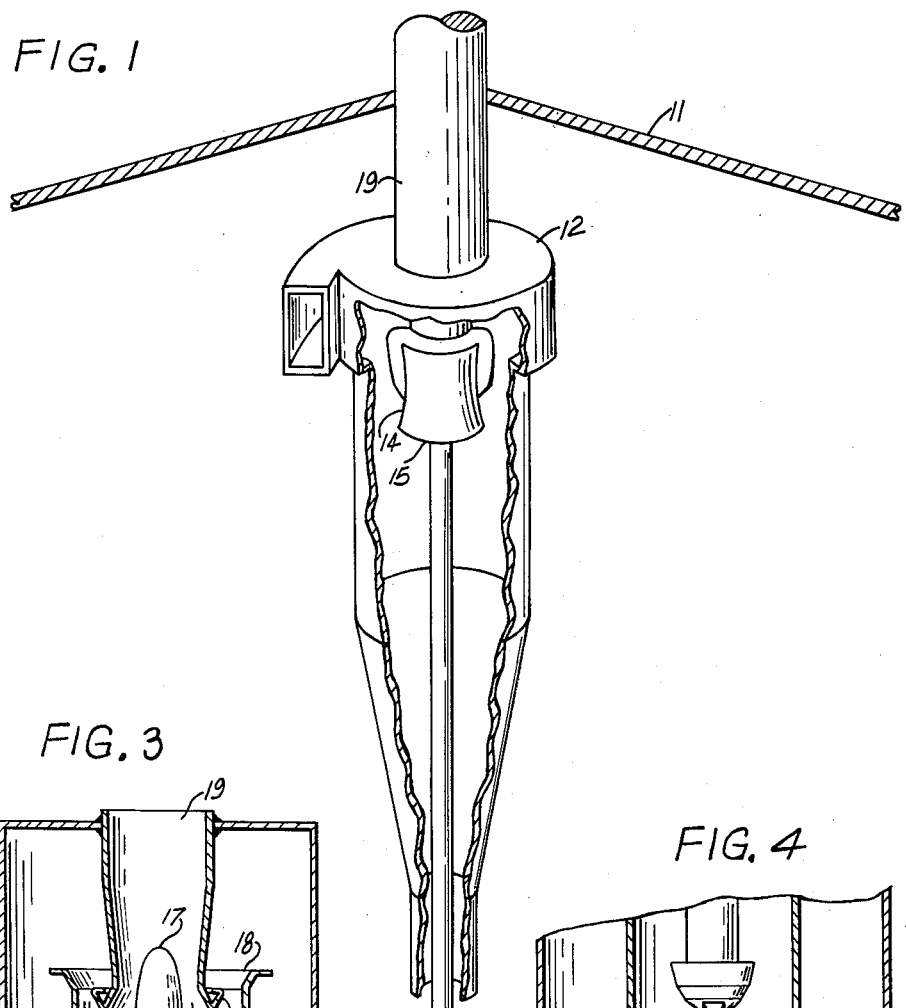
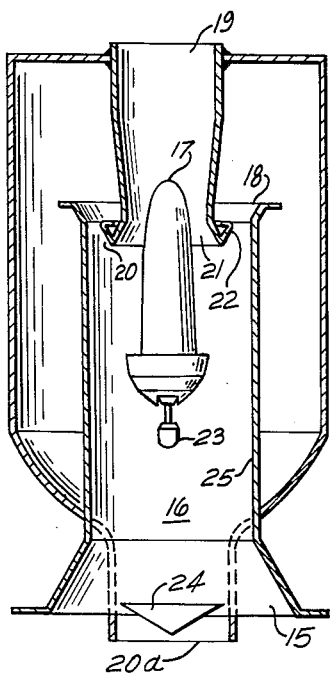
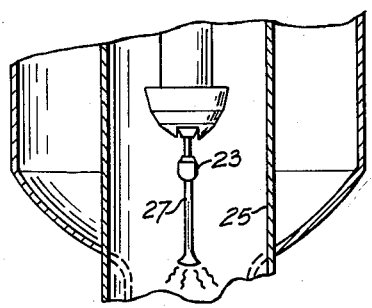
WILLIAM K. FORTMAN
GEORGE B. OUJEVOLK
INVENTORS

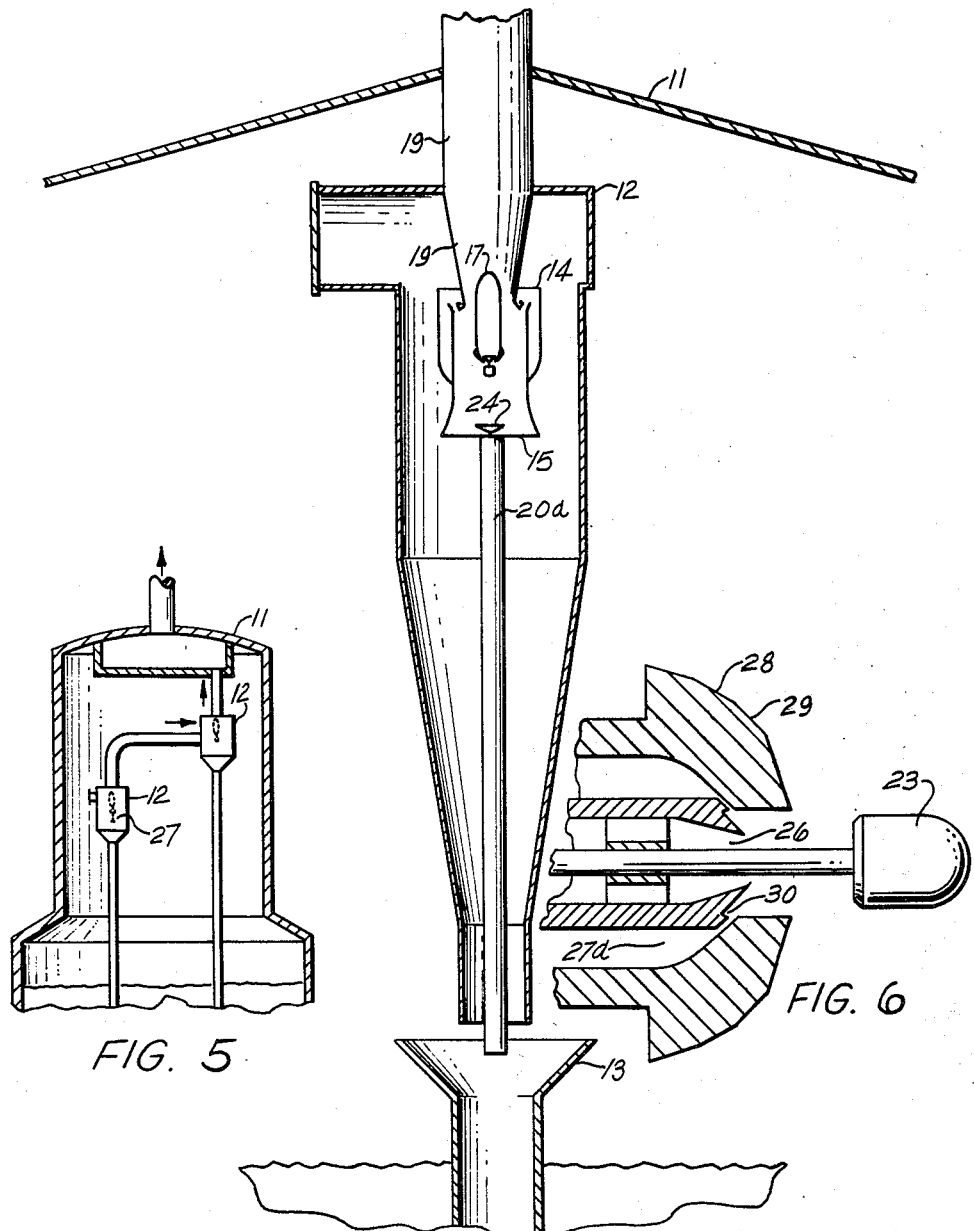

3,172,744
REMOVAL OF SOLIDS FROM A SOLID LADEN GAS
William K. Fortman, Metuchen, and George B. Oujevolk, Waldwick, N.J., assignors to General Precision, Inc., Little Falls, N.J., a corporation of Delaware
Filed Aug. 22, 1960, Ser. No. 51,198
3 Claims. (Cl. 55—263)

The present invention relates to the removal of particles from a fluid, i.e., gas stream and more particularly to the removal of such particles in a sound field. The invention has special utility in the fluid catalytic conversion or cracking of hydrocarbons and in hydrocarbon refining.

It is well known that the removal of particles, e.g., powdered catalysts in fluid streams is an industrial problem. In many chemical and industrial processes, a treated material or catalyst is subjected to the action of a fluid, liquid or gas, at one stage of the process. At another stage of the process, a fluid is recovered which is filled with unwanted particles of material or catalyst so that the contaminating particles must first be removed before the process may proceed further. Some types of equipment presently available contain cyclones or centrifuging particle removers. These devices are not too efficient. The centrifuging devices often impart an unwanted turbulence to the gas or air and require considerable power. Cyclones are more extensively used, particularly in the fluid catalytic conversion of hydrocarbons. However, when leaving a cyclone, the gases, e.g., hydrocarbon gases still contain a considerable amount of contaminants. The removal of particles from a gas stream is especially a problem in the fluid catalytic cracking of hydrocarbons as will be more clearly apparent from the following passage contained in Perry's "Chemical Engineers' Handbook," pages 1618–1619, McGraw-Hill Book Co., 1950 edition.

"The reactors are vertical, cylindrical steel vessels containing a mass of finely divided catalyst suspended by the flow of vaporized feed stock. Gas velocities through the reactor are low, in the order of 0.5 to 2 ft./sec., based on the empty cross section, but sufficiently high to maintain a fluidized bed of solids having many of the properties of a liquid. The feed stock is vaporized before it enters the reactor by contact with hot, regenerated catalyst (1000° to 1150° F.). The vaporized feed entrains the regenerated catalyst and carries it into the reactor through a distributing grid. The reactor temperature is maintained at 800° to 1000° F. The cracked feed stock passes from the catalyst bed through cyclone dust collectors installed in the upper part of the reactor and thence to the fractionating system.

"Carbon unavoidably deposited on the catalyst during the reaction must be removed periodically by being carried through the following cycle. From the reactor bed, spent catalyst flows by gravity through a steam-stripping section and discharges through a standpipe into a heated air stream. This air flow entrains the catalyst and conveys it up through a grid into a regenerator where the carbon is burned off, at temperatures of 1000° to 1150° F. The regenerator is similar in construction to the reactor but normally lined with a refractory to protect the metal walls. Internal metal parts, including the cyclone are fabricated from temperature-resistance alloys. Hot regenerated catalyst flows by gravity through a standpipe pipe to be entrained by the feed entering the reactor, thus completing the catalyst cycle. The hot flue gas from the regenerator passes through a waste-heat boiler, a Cottrell precipitator, and thence to a stack. On newer units, a microspheroidal catalyst is employed which can be satisfactorily recovered from the gas stream without using a Cottrell unit. There is some loss of catalyst from attrition, and makeuup must be added continuously. A rapid flow catalyst is maintained between the reactor and regenerator, in order to maintain constant catalyst activity and uniform bed temperatures. For example, a 15,000 bbl./day unit has been reported to include a reactor 25 ft. diameter by 50 ft. high, containing 75 to 100 tons of catalyst. In this unit, 8 to 50 tons/min. of catalyst were circulated to the regenerator where the holdup was 150 to 300 tons. The heat transfer from the regenerator to the reactor will range above 150 million B.t.u./hr. Units have been installed with capacities as high as 41,000 bbl./day."

In the foregoing type of unit, a considerable amount of catalyst particles are not separated from the gases in the cyclones located in the apparatus but leave the apparatus in the gas stream. As these gases must later be subjected to further processing, the contaminants must first be removed thereby increasing the complexity of the operation.

In the process just described, the gas flow rate is rather slow. In some processes, a high gas velocity is required to keep the catalytic particles in suspension. The temperature must be sufficiently high to maintain the hydrocarbon in the gas phase because the liquefaction of the treated hydrocarbon promotes gradual deposition and accumulation of extremely fine particles of solids on the walls of the gas-solid particle separation means, often to a point where the passage of the gas through the separation means is completely obstructed.

Reference has already been made in technical literature to sound pressure forces, radiation pressure, and other acoustic phenomena which are always present to a greater or lesser degree when sound of an audible or ultrasonic frequency is generated. However, directional sonic radiation pressure against a particle, i.e., a directional force not in the direction of the aerodynamic effects is not readily achieved in practice. Thus, Bergman, "Ultrasonics," page 44, John Wiley & Sons, translation 1938 edition, states: "When sound waves meet an obstacle they exercise on it, in addition to known alternating pressure a unidirectional pressure." Crawford in "Ultrasonic Engineering," 1955, page 161, states: "In commercial equipment using sirens, measured intensities of several thousand ergs/cm.$^3$ have been noted. This corresponds to several watts/cm.$^2$. The amplitude required to produce 100 and 1000 erg/cm.$^3$ at 10 kc. is about 80–250$\mu$ respectively. An average water droplet can be held against the gravitational pull by 400 erg/cm.$^3$ at 10 kc." Heuter Bolt in "Sonics," 1955, page 44, states "Thus sound pressure and radiation pressure are two related phenomena associated with the transport of energy in a sound field." On pages 220–221 of "Sonics," 1955, it is stated that "A force $F_r$ appears within a medium subjected to sound waves whenever there is a discontinuity of energy density $E=Ic$ (where $I$ is the intensity and $c$ is velocity). When particles are much smaller than wave length they can essentially be considered as sources of scattering. Such scattering leads to a non-uniformity of energy density in the immediate vicinity of the particle. The resulting force on a small rigid particle can be evaluated." Ultrasonics have been used to separate aerosols from gases for some purposes, but heretofore, as taught in the Abboud U.S. Patent No. 2,769,506, filtering means are required, e.g., a porous filter bag positioned under the sound source.

In certain processes, particularly in the fluid catalytic cracking of hydrocarbons, the use of filters is not possible as the particles contained in the gas must be recovered and recirculated, and because of the impossibility of constantly getting to and changing the filters. Although many attempts have been made to remove particles from a fluid stream by means of ultrasonics without the use of filters, none, as far as we are aware have ever been successful when carried out into practice on an industrial scale.

It has now been discovered that particles in fluid streams can be removed by ultrasonic means.

Thus, it is an object of the present invention to remove particles from fluid streams by ultrasonic means.

A further object of the present invention is the provision of an ultrasonic station in a cyclone for the removal of particles.

Still another object of the present invention is the removal of contaminants entering hydrocarbon fluids during the fluid catalytic cracking of the hydrocarbons.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawing in which:

FIGURE 1 is a vertical sectional view taken through a portion of a fluid catalytic unit reactor showing the positioning of the arrangement contemplated herein;

FIG. 2 shows a vertical sectional view of a cyclone provided with the arrangement contemplated herein;

FIG. 3 depicts an enlarged view of the arrangement contemplated herein;

FIG. 4 illustrates another embodiment of the invention contemplated herein;

FIG. 5 is a view of a series arrangement contemplated herein; and,

FIGURE 6 is a longitudinal cross-sectional view of a portion of a sound source used in the present invention.

The present invention revolves around three fundamental concepts. First, it is necessary to produce a sound of such intensity as to be at least capable of producing "cold boiling" in water at a distance of over about five inches. Cold boiling is a known phenomenon and means that water is boiled solely by sound means. Secondly, the frequency of the sound should be such as to subject the particles in the fluid to a substantial number of sound waves per second, and the sound frequency should be at least over about 4000 c.p.s. The most useful frequency range is between about 8000 c.p.s. and 50,000 c.p.s., the preferred range being between 8000 c.p.s. and 32,000 c.p.s. Thirdly, the configuration of the sound source zone and the acoustic chamber surrounding the zone should be such as to direct the particles acted upon by the sound source into a particle removal zone while directing the fluid containing the particles into a fluid outlet duct. When a sound of high intensity is produced, a partial evacuation of the fluid medium in the immediate vicinity of the sound source takes place. The evacuated fluid tends to go to a position beyond and behind the sound source. Particles in the fluid, particularly if they are aerosol particles tend to move in the direction of the sound waves, and will so move if the intensity of the sound is sufficient to overcome the aerodynamic force of the fluid rushing towards and past the sound source.

The invention in its broadest aspects utilizes a chamber provided with a centrally located sound zone and a particle removal zone along the walls of the chamber towards the discharge end thereof. A high intensity sound source is located towards the discharge end of the chamber, and, in operation, the fluid streams into the chamber towards and past a boundary between the sound zone and the particle removal zone of the arrangement. The particles by virtue of their velocity and modified trajectory continue in a path which carries them beyond the lips into a particle removal zone of the apparatus where they drop by gravity or are recirculated to other components of the system, e.g., the regenerator.

In the type of reactors 11 shown in the drawing, the catalyst powder ranges from 50 microns in diameter downwards. Particles of about 50 microns size and larger when processed through cyclone 12 will usually fall by gravity into hopper 13 to be carried into a dipleg or regenerator which is not shown in the drawing. There are however in the catalyst a number of particles of a size of approximately 20 microns and under. Many of these smaller particles will go along with the gas fluid and form a contaminant. Although the arrangement contemplated herein is in one view shown in connection with cyclone 12, the arrangement may be used for other purposes without the cyclone. The cyclone serves to account for a large percentage of the larger particle sizes in the fluid but does not account for all the particles. As shown in the drawing, the arrangement herein contemplated includes an elongated chamber 14 which may advantageously be contained in the cyclone 12 of reactor 11. The fluid to be treated for particle or contaminant removal enters the chamber 14 through a wide mouth 15 into a sound field 16 caused by a sound wave generator or whistle 17 located at the far end 18 of the chamber 14. The whistle 17 is surrounded by a duct 19 serving as the outlet passage for the oncoming fluid. The space between the duct and the chamber inner wall serves as the particle removal zone 20. The whistle 17 projects from the duct and the duct entrance 21 has tapered outwardly flanged walls 22. Sound wave generator or whistle 17 is a stem-jet type whistle having a resonance chamber 23. There can also be provided at the mouth 15 of the chamber, a deflector 24. Deflector 24 will deflect the fluid towards the chamber inner walls 25, and the contaminating particles in the fluid will tend to move along the wall whereas the fluid itself partially freed from the contaminants will tend to move inwards towards duct 19 because of the partial vacuum caused by the sound wave. The inner surface of the deflector may be concave so as to reflect the sound if a standing wave arrangement can be used. A standing wave will tend to halt the onward movement of the particles and maintain them in the sound zone. The particles which are not along the walls will tend to collect at the nodal points where they can be subjected to the action of steam, forming aerosols which increase the size and weight of the particles making them more susceptible to sonic radiation pressure. For many applications a standing wave may either not be necessary or cannot be used in connection with other features of the process in which case the deflector does not have an inner concave surface. Whistle 17 is between about two to five inches in length and between about one to three inches in diameter and should be capable of delivering a sound of an intensity of between about 140 db to about 160 db at a distance of some ten inches from the sound source. In using the whistle in the fluid catalytic conversion of hydrocarbons, e.g., cracking, in addition to the use of sound producing gases sent through the whistle sound orifice 26, steam may also be introduced through the whistle stem 27 which passes through the resonance chamber 23 to deliver the steam towards the center of the chamber. The use of steam in this manner forms a secondary micromist aerosol particle of the contaminant which makes the particles more responsive to radiation pressure and agglomeration. This arrangement is particularly useful in combination with a standing wave where the nodal points at which the particles tend to collect will be located just past the steam discharging station. As shown in FIG. 4, additional steam may also be supplied by the provision of outer passage 27*a* surrounding the central sound producing nozzle. Stem-jet generator or whistle 17 will preferably have a convex radiator 28 having outwardly directed shock ridges 29. The sound intensity can also be measurably increased by the provision of a secondary resonance chamber 30 interposed between the radiator 28 and the sound orifice 26, and axially opposed to the resonator 23. The particles moving along the chamber walls 25 will pass between the tapered outwardly flanged duct walls 22 into the particle removing zone 20 and from there pass to the particle discharge end 20*a* of the device.

A single unit of the type shown in FIG. 3 will account for over 90% of the individual particles under 20 micron size which escape the cyclone and attempt to enter outlet passage 19. To further reduce the number of such particles, a second unit may be provided in series with the first unit. However, to prevent unnecessary acoustic effects by a plurality of units, it is preferable that the second unit be so arranged as not to be in exactly the same planes as the first unit, i.e., directly on top of the first unit. By the series arrangement of FIG. 5 perhaps one-tenth of one percent of the contaminants passing through the cyclone will remain in the fluid output, e.g., a tube 6 inches diameter carrying hot hydrocarbon gases at between about 0.5 to about 60 feet per second, depending on the hydrocarbon being processed, with 4 to 6 grains per cubic feet of particles of about 20 micron size and under will have only between 4 to 6 grains per one thousand cubic feet when subjected to acoustic shock wave radiation of between 8 and 50 kilocycles of a three gang arrangement.

In most processes the velocity depends on the particle size distribution of the fluid bed particles. The velocity must be sufficiently high to maintain the catalyst in suspension and carry it along with the vapors; but, to remove the particles by existing apparatus on the other hand, a low velocity is preferred. When using the arrangement contemplated by the present invention, contrary to the teachings of the prior art, a rapid fluid flow of between 40 and 100 feet per second is preferred. Particles in streams moving at well over 100 feet per second are readily recovered and radical change in the gas velocity is eliminated.

As the sound producing gas, it is possible to use steam, air, and even a treated hydrocarbon gas stream from a later stage of the process which is recycled back.

The variations in the embodiments herein described are for the most part caused by the differences in chemical processes and apparatus rather than by differences in the acoustic effects. Usually, steam is introduced at high pressure into a reactor to inhibit poisoning of the hot granular catalyst in the reactor by metallic contaminants in the hydrocarbon components, but it is preferable to accomplish hydrocarbon cracking with a minimum of steam so as to avoid over-cracking of the readily-cracked components of the hydrocarbon charge. By means of the arrangement herein described steam may not only be kept to a minimum, but, if the process can tolerate a small percentage of contaminants, particularly in some stages, about 90% to about 95% of the metallic contaminants in hydrocarbon vapors may be removed simply by the whistle arrangement shown in FIG. 3, without using steam through the stem or the outer passages. This is particularly true when more than one whistle arrangement is used in series as shown in the drawing. Many hydrocarbon conversion units presently in operation are so constructed as to use a certain amount of steam in the operation. In such case the amount of steam provided through the whistle stem will fall within the steam percentage for which the apparatus is designed. The difference between introducing steam through stem 27 and outer passage 27a is that the steam through the outer passage is introduced counter flow to the oncoming gas or vapor whereas the steam in the stem may be introduced at substantially right angles to the oncoming gas or vapor.

It is to be observed therefore that the present invention provides an apparatus for the removal of contaminating particles contained in a fluid, e.g., particles of catalytic contaminants contained in processed hydrocarbons. The fluid in the gas phase is directed into an acoustic chamber having a sound source at the far end thereof at speeds of between 0.5 and 60 feet per second; and is preferably subjected to the action of steam in advance of the sound source so as to form aerosols of the contaminating particles. The sound source radiates on the particles sound waves of an intensity sufficient to cause the cold boiling of water at a distance of between five and twenty-five inches, i.e., sound of an intensity of between about 140 db to 160 db or over if possible, the sound waves being generally radiated towards the walls of the chamber. The particles are removed from the chamber through a particle removing zone along the chamber walls while the substantially particle free fluid is removed through an outlet positioned behind the sound source. The amount of particles removed may be substantially increased by placing the arrangement herein described in a cyclone and first passing the gas or vapor through the cyclone so as to remove the larger particles. As used herein, the expression "gas" and "vapor" are synonymous and merely means gas phase. Furthermore, the apparatus described is also useful with those hydrocarbon processes where the hydrocarbons are introduced into reacting vessels in a partial vapor phase and the expression gas phase as used herein is meant to include partial vapor phase.

It is to be observed that the present invention provides for a device for the removal of particles from a fluid stream. The device comprises an elongated chamber 14 having an entrance 15 and a discharge end. There is an outlet duct 19 towards the discharge end, the cross-sectional area of said duct being somewhat smaller than the cross-sectional area of said chamber. A sound source 17 is positioned past the inlet of said duct so as to radiate sound towards said chamber entrance; e.g., the sound radiator may be partly emerging past the inlet of said duct into said chamber. The sound source must produce sound of an intensity sufficient to produce cold boiling in water at a distance of from five to twenty-five inches from the sound source towards the chamber walls. A particle removal zone 20 is provided to remove particles from the chamber. The sound frequency should be above about 4000 c.p.s., i.e., between about 8000 c.p.s. and 50,000 c.p.s., preferably between about 8000 c.p.s. and 32,000 c.p.s. The device is preferably mounted in a cyclone 12. The sound source 17 herein contemplated is of the stem-jet type having a resonance chamber 23, a radiator 28 and preferably a secondary resonance chamber 30 surrounding the sound source. Additional steam can be supplied through the stem 27 past the resonance chamber and also through the sound source outer passage 27a. Also, a deflector 24 can be used to provide a standing wave to facilitate removal of the particles. To increase the effectiveness, series and parallel arrangements are also possible.

The types of hydrocarbon conversion in which the present invention is useful includes, and is not limited to, catalytic dehydrogenation, hydroforming, desulfurization, coking, and cracking of hydrocarbon fractions; and, the device herein described may be used in the reactor, the regenerator, recovery equipment or fractionating and condensing apparatus.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

We claim:

1. A device for the removal of solids from a solid laden gas, comprising in combination, a vertically disposed cyclone; a cyclone gas inlet tangentially mounted towards the top of said cyclone; a cyclone solid particle outlet at the bottom of said cyclone, the solid particles in a gas tangentially entering said cyclone tending to rotate around said cyclone walls into said cyclone solid particle outlet; a cyclone gas outlet mounted towards the center of the top of said cyclone; an elongated vertical chamber disposed in said cyclone gas outlet, said chamber including an inner wall and having an entrance towards the bottom and a discharge end towards the top of the chamber; an outlet duct including an outer wall, entering said chamber at the discharge end thereof, the cross-sectional area of said duct being sized a little smaller than the cross-sectional area of said chamber, said chamber inner wall and said duct outer wall forming a solid particle removal zone therebetween; a whistle sound source extending from within said outlet duct partly into said chamber, the sound end thereof being in said chamber so as to radiate sound towards said chamber entrance, said sound source being capable of directionally radiating a sound of over 140 db at a frequency of over about 4,000 c.p.s. at a distance of over about five inches from the sound producing portion of said sound source; and, a passage leading from said solid particle removal zone to said cyclone solid particle outlet.

2. A device as claimed in claim 1, the cyclone having said chamber therein being a first solid particle removal stage, and, a second cyclone likewise having a chamber and sound source therein as in said first stage, said second cyclone being connected in series to said first cyclone, whereby a gas stream substantially freed of solid particles in said first cyclone is passed on to said second cyclone where additional solid particles can be removed.

3. A device as claimed in claim 2, said whistle sound source being of the stem-jet type having a resonance chamber opposed to said sound source, the stem of the sound source in the first solid particle removal stage being hollow and extending past said resonance chamber and adapted to deliver a second phase fluid in the chamber of said first solid particle removal stage.

References Cited by the Examiner

UNITED STATES PATENTS

| | | |
|---|---|---|
| 556,291 | 3/96 | Turner. |
| 1,980,171 | 11/34 | Amy. |
| 2,216,779 | 10/40 | Houghton et al. _____ 55—15 |
| 2,238,668 | 4/41 | Wellenstein. |
| 2,300,761 | 11/42 | Amy _____ 55—15 |
| 2,369,020 | 2/45 | Clark _____ 55—277 |
| 2,514,080 | 7/50 | Mason. |
| 2,517,141 | 8/50 | Smith _____ 208—161 |
| 2,576,297 | 11/51 | Horsley et al. _____ 55—292 X |
| 2,646,133 | 7/53 | Schutt. |
| 2,755,767 | 7/56 | Levavasseur _____ 116—137 |
| 3,026,966 | 3/62 | Asklof _____ 55—15 |
| 3,053,031 | 9/62 | Vedder et al. _____ 55—292 |
| 3,064,619 | 11/62 | Fortman. |
| 3,117,551 | 1/64 | Fortman et al. _____ 116—137 |

FOREIGN PATENTS

| | | |
|---|---|---|
| 454,050 | 9/36 | Great Britain. |
| 593,911 | 5/59 | Italy. |

OTHER REFERENCES

Report on the Operation of a New Type Sonic Collector for the Recovery of Sulfuric Acid Fog and Fume, Ultrasonic Corporation, 61 Rogers Street, Cambridge, Mass., dated Sept. 20, 1949, 7 pages.

HARRY B. THORNTON, *Primary Examiner.*

ALPHONSO D. SULLIVAN, *Examiner.*